UNITED STATES PATENT OFFICE.

JOSEPH BIERER, OF BASLE, SWITZERLAND, ASSIGNOR TO L. DURAND, HUGUENIN & CO., OF SAME PLACE, ST. FONS, FRANCE, AND HÜNINGEN, GERMANY.

BLUE DYE.

SPECIFICATION forming part of Letters Patent No. 534,809, dated February 26, 1895.

Application filed November 8, 1894. Serial No. 528,211. (Specimens.) Patented in France October 31, 1893, No. 227,509.

*To all whom it may concern:*

Be it known that I, JOSEPH BIERER, chemist, a citizen of the French Republic, residing at Basle, Switzerland, have invented new and useful Improvements in the Production of Blue Dye-Stuffs or Coloring-Matters, (for which Letters Patent have been granted in France, dated October 31, 1893, No. 227,509;) and I do hereby declare the following to be a full, clear, and exact description of the invention, such as will enable others skilled in the art to which it appertains to make and use the same.

The invention relates to the manufacture of blue dye-stuffs or coloring matters, by the action of dialkylamidoazo benzene sulfo acids which possess at least one sulfo-group in the second benzene-nucleus, upon a gallic compound as for instance, gallic acid, gallamic acid, methyl ether of gallic acid, gallanilid, &c. Thus are obtained coloring matters, some of which are directly soluble in water while the others are soluble in alkaline water, or in a solution of sodium acetate, which coloring matters dye wool and silk directly (without a mordant) in an acid bath. They have, however, a great affinity for metallic mordants. These new coloring matters represent new sulfonated gallocyanin dyes and have nearly the same characteristics, to wit: first, they dissolve in a solution of sodium acetate,—either cold or hot—producing a blue color; second, they dissolve in solutions of caustic alkalies, producing a violet blue color; third, their solutions in ordinary hydrochloric acid are red and they retain this color on the addition of water to the acid; fourth, they dissolve in concentrated sulfuric acid, producing a bluish or violet red color, which turns to red by the addition of water.

By the dialkylamidoazo benzene sulfo acids, sulfonated in the second benzene-nucleus, I mean those which have at least one sulfo group in the benzene-nucleus, which—on the splitting of the dialkylamidoazo-compound by its reduction—causes the formation of a diamido derivative, as for example:

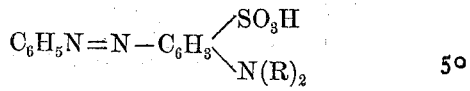

or

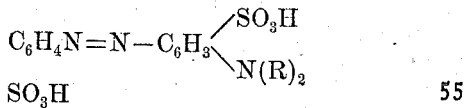

whereby R represents an alkyl rest, as for example a methyl or ethyl rest. In the second case, there is a sulfo group in both benzene nuclei. Such amidoazo compounds can be obtained by the known methods, as for example: *a*, by directly sulfonating the dialkylamidoazo benzene by fuming sulfuric acid, whereby both benzene nuclei are sulfonated; *b*, by the action of diazo benzene sulfo acids upon the sulfo acids of tertiary aromatic amins, as for instance the dimethylanilin sulfo acid 1.3, whereby there results also a dialkylamidoazo benzene, sulfonated in both benzene nuclei; *c*, by the action of diazo benzene upon the sulfo acids of the tertiary aromatic amins, as for example, diethylanilin sulfo acid 1.3, whereby results a dialkylamidoazo benzene sulfonated only in the second benzene-nucleus.

*Example I.*—Ten kilos of gallamic acid, fifty kilos of diethylamidoazo benzene mono sulfoacid (obtained in the manner indicated above under *c*) and one hundred and fifty kilos of glacial acetic acid, are heated from 100° to 130° centigrade, until a sample taken from the mass no longer shows the presence of free diethylamidoazo-benzene sulfonic acid. The reaction takes place rapidly and is completed by heating. The product of the reaction is poured into water and the coloring matter can be directly isolated in the condition of an acid, or by addition of the necessary quantity of soda, in the condition of a sodium salt. For this purpose, the aqueous alkaline solution of the coloring matter is filtered and the coloring matter is thrown down from the filtered solution by the addition thereto of common salt and recovered, after filtration, as a paste. It furnishes, with chrome-mordants, in an alkaline bath, greenish blue tints which are fast both to light and fulling. If, in the foregoing example, the gallamic acid is replaced by an equal quantity of gallic acid, there is also obtained a coloring matter, which is soluble in water and has otherwise the same properties as the coloring matter last described. Further, if in the same example, fifty kilos of dimethylamidoazobenzenemonosulfo acid are employed in the place of the fifty kilos of diethylamidoazo benzene-monosulfo acid, the coloring matter obtained gives dyes producing blue tints which are a little reddish.

*Example II.*—Ten kilos of gallic acid, sixty-two kilos of diethylamidoazobenzenedisulfo acid (obtained as stated above under *a*), and one hundred and fifty kilos of glacial acetic acid, are treated as described in the first example. The result of the reaction is a sulfonated coloring matter, which is easily soluble in an aqueous solution of sodium acetate and dyes chromed wool a greenish blue tint. If, in this example, an equivalent quantity of the methylether of gallic acid is substituted for the ten kilos of gallic acid, there is obtained a coloring matter, which, in the condition of sodium salt, can easily be salted out from its aqueous solutions and presents the same properties as the corresponding dye-stuff derived from gallic acid.

*Example III.*—By treating ten kilos of gallanilid (the product of condensation of tannin with anilin) sixty-two kilos of diethylamidoazobenzene disulfo acid (obtained as stated above under *b*), and one hundred and fifty kilos of glacial acetic acid, as described in Example I, the coloring matter obtained, when in the condition of an acid, is insoluble in water, but soluble in a hot solution of sodium acetate. It dissolves very easily in alkaline solutions and dyes chromed wool a more greenish tint than the blue coloring matters above described. Instead of precipitating the coloring matters by common salt, they can be precipitated,—because of their insolubility in alcohol,—by the addition of alcohol, as will appear from the following example.

*Example IV.*—Ten kilos of gallamic acid, sixty kilos of dimethylamidoazo benzene disulfonate of sodium, one hundred kilos of glacial acetic acid, and five kilos of hydrochloric acid, are heated to 120° centigrade. As soon as a sample taken from the mass shows no more free dimethylamidoazo benzene-disulfo acid, the product of the reaction is poured into alcohol. The coloring matter, which is directly soluble in water, is precipitated in an alcoholic medium and is separated by filtration, pressed and dried. This coloring matter dyes unmordanted wool and silk, in an acid bath, a blue-green tint. On chromed wool, it yields greenish blue to a reddish blue tint.

Having thus described my invention, I claim—

1. A process for the manufacture of sulfonated gallocyanin dyes, which consists in heating a dialkylamidoazo benzenesulfoacid, having a sulfo group in the second benzene nucleus,—that is, in the benzene nucleus which forms a diamido-derivative on the splitting of the amidoazo compound by reduction,—with a gallic compound, in the presence of a suitable solvent, substantially as set forth.

2. A process for the manufacture of sulfonated gallocyanin dyes which consists in heating gallamic acid with a dialkylamidoazo benzene sulfo acid, in the presence of acetic acid, substantially as set forth.

3. As a new article of manufacture, the herein described blue gallocyanin dye, derived from a dialkylamidoazobenzenesulfoacid having at least one sulfo group in the second benzene-nucleus, the said dye being soluble in water, insoluble in alcohol, dissolving in a solution of sodium acetate with blue color, in caustic alkalies with a violet blue color, in ordinary and diluted hydrochloric acid with a red color and in concentrated sulfuric acid with a bluish to violet red color, which turns to red by the addition of water, and the said dye dyeing wool and silk directly (without mordant) in an acid bath and presenting also a great affinity for metallic mordants, substantially as set forth.

In witness whereof I have hereunto signed my name in the presence of two subscribing witnesses.

JOSEPH BIERER.

Witnesses:
 GEORGE GIFFORD,
 FALCONER E. CROWE.